US011873948B2

(12) United States Patent
Nakano et al.

(10) Patent No.: US 11,873,948 B2
(45) Date of Patent: Jan. 16, 2024

(54) MANAGEMENT SYSTEM

(71) Applicant: Komatsu Ltd., Tokyo (JP)

(72) Inventors: Ichiro Nakano, Tokyo (JP); Toyohisa Matsuda, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 18/096,717

(22) Filed: Jan. 13, 2023

(65) Prior Publication Data
US 2023/0151930 A1    May 18, 2023

Related U.S. Application Data

(63) Continuation of application No. 16/094,054, filed as application No. PCT/JP2017/028502 on Aug. 4, 2017, now Pat. No. 11,585,490.

(30) Foreign Application Priority Data

Aug. 5, 2016 (JP) .................................. 2016-155102

(51) Int. Cl.
*F17C 13/02* (2006.01)
*E02F 9/26* (2006.01)
(Continued)

(52) U.S. Cl.
CPC ............ *F17C 13/026* (2013.01); *E02F 9/261* (2013.01); *F17C 1/00* (2013.01); *F17C 5/06* (2013.01);
(Continued)

(58) Field of Classification Search
CPC .. F17C 13/026; F17C 1/00; F17C 5/06; F17C 1/08; E02F 9/261; F17D 1/08; G01B 11/245; H04N 7/185
(Continued)

(56) References Cited

U.S. PATENT DOCUMENTS 6,055,214 A * 4/2000 Wilk ....................... G01S 15/89
                                                                 89/1.13
10,233,615 B2   3/2019 Yamaguchi et al.
(Continued)

FOREIGN PATENT DOCUMENTS

CN       105518228 A    4/2016
DE       101 60 084 A1  7/2002
(Continued)

OTHER PUBLICATIONS

International Search Report dated Oct. 10, 2017, issued for PCT/JP2017/028502.
(Continued)

*Primary Examiner* — Yazan A Soofi
(74) *Attorney, Agent, or Firm* — Locke Lord LLP

(57) ABSTRACT

A management system includes a position detection unit which obtains a position of a work machine, a posture detection unit which obtains a posture of the work machine, an object detection unit which obtains a three-dimensional shape of a buried object, a position calculation unit which obtains a position of the buried object by using the position of the work machine obtained by the position detection unit, the posture of the work machine obtained by the posture detection unit, and the three-dimensional shape of the buried object obtained by the object detection unit, and an information acquisition unit which acquires buried object information including at least the position of the buried object obtained by the position calculation unit.

10 Claims, 8 Drawing Sheets

(51) Int. Cl.
  *F17C 1/00*    (2006.01)
  *F17C 5/06*    (2006.01)
  *F17D 1/08*    (2006.01)
  *G01B 11/245*   (2006.01)
  *H04N 7/18*    (2006.01)
  *E02F 3/32*    (2006.01)
  *G01S 19/47*    (2010.01)

(52) U.S. Cl.
  CPC .............. *F17D 1/08* (2013.01); *G01B 11/245* (2013.01); *H04N 7/185* (2013.01); *E02F 3/32* (2013.01); *F17C 2205/0376* (2013.01); *F17C 2221/012* (2013.01); *F17C 2223/0123* (2013.01); *F17C 2225/0123* (2013.01); *F17C 2225/036* (2013.01); *F17C 2227/0157* (2013.01); *F17C 2227/0341* (2013.01); *F17C 2250/032* (2013.01); *F17C 2250/043* (2013.01); *F17C 2250/0439* (2013.01); *F17C 2250/0443* (2013.01); *F17C 2250/0694* (2013.01); *F17C 2260/023* (2013.01); *F17C 2260/026* (2013.01); *F17C 2265/065* (2013.01); *F17C 2270/0178* (2013.01); *F17C 2270/0184* (2013.01); *G01S 19/47* (2013.01); *Y02E 60/32* (2013.01); *Y02E 60/34* (2013.01)

(58) Field of Classification Search
  USPC .......................................................... 701/32
  See application file for complete search history.

(56) References Cited

U.S. PATENT DOCUMENTS

| | | |
|---|---|---|
| 2004/0210370 A1 | 10/2004 | Gudat et al. |
| 2006/0091888 A1 | 5/2006 | Holman et al. |
| 2009/0290757 A1* | 11/2009 | Mian .................... G06V 20/653 |
| | | 382/104 |
| 2010/0052684 A1 | 3/2010 | Fling et al. |
| 2011/0112787 A1 | 5/2011 | Daw et al. |
| 2014/0100744 A1 | 4/2014 | Johnson et al. |
| 2014/0218225 A1 | 8/2014 | Simicevic et al. |
| 2016/0244950 A1* | 8/2016 | Kami ....................... E02F 9/265 |
| 2017/0107698 A1* | 4/2017 | Yamaguchi ............... G06T 1/00 |
| 2020/0032464 A1* | 1/2020 | O'Donnell .............. G01S 19/14 |
| 2021/0396528 A1* | 12/2021 | St. Romain ........ G01C 21/3841 |
| 2022/0073077 A1* | 3/2022 | Taieb ............... G08G 1/096725 |

FOREIGN PATENT DOCUMENTS

| | | |
|---|---|---|
| DE | 10 2010 050 888 A1 | 9/2011 |
| JP | 06-230141 A | 8/1994 |
| JP | 2004-198169 A | 7/2004 |
| JP | 2008-216143 A | 9/2008 |
| JP | 2013-36243 A | 2/2013 |
| JP | 2015-195457 A | 11/2015 |
| WO | 2008/064852 A2 | 6/2008 |

OTHER PUBLICATIONS

Office Action dated Sep. 28, 2023, issued in the corresponding DE patent application No. 112017002047.6.

* cited by examiner

| ID | POSITION Ptu | TYPE TY | SIZE Sz | DATE DT |
|---|---|---|---|---|
| 001 | Ptu1 | TYG | Sz1 | 2016.5.6 |
| 002 | Ptu2 | TYW | Sz2 | 2012.3.1 |
| ⋮ | ⋮ | ⋮ | ⋮ | ⋮ |
| 00n | Ptun | TYW | Szn | 2015.7.3 |

IFd1(IFd), IFd2(IFd), IFdn(IFd), DB

MANAGEMENT SYSTEM

FIELD

The present invention relates to a management system for managing a position of a buried object buried in the ground.

BACKGROUND

There are work machines having imaging devices. Patent Literature 1 discloses a technique of generating a construction plan image data on the basis of a construction plan data stored in a storage unit and position information of a stereo camera, superposing the construction plan image data and a current state image data imaged by the stereo camera, and three-dimensionally displaying a superimposed synthesized image on a three-dimensional display device.

CITATION LIST

Patent Literature

Patent Literature 1: Japanese Laid-open Patent Publication No. 2013-036243

SUMMARY

Technical Problem

When a work machine constructs an object, a work of digging earth may be performed. In a case where there is a buried object buried in the ground, if the work is proceeded without knowing the existence of the buried objects, there is a possibility that the work machine may damage the buried objects. For this reason, it is desirable to acquire in advance information (hereinafter, appropriately referred to as buried object information) including at least the position of the buried object. Since the buried object information is obtained by an operator measuring, a burden of work for obtaining the buried object information is increased.

It is an object of the present invention to realize at least one of reducing a burden of work for obtaining buried object information and reducing a possibility of damage to a buried object under construction.

Solution to Problem

According to a first aspect of the present invention, a management system comprises: a position detection unit configured to obtain a position of a work machine; a posture detection unit configured to obtain a posture of the work machine; an object detection unit configured to obtain a three-dimensional shape of a buried object; a position calculation unit configured to obtain a position of the buried object by using the position of the work machine obtained by the position detection unit, the posture of the work machine obtained by the posture detection unit, and the three-dimensional shape of the buried object obtained by the object detection unit; and an information acquisition unit configured to acquire buried object information including at least the position of the buried object obtained by the position calculation unit.

According to a second aspect of the present invention, in the management system according to the first aspect, wherein the object detection unit has a stereo camera which is attached to the work machine and includes at least a pair of imaging devices, and wherein the management system further comprises an identifier assignment unit configured to assign an identifier to an image of the buried object imaged by the imaging device.

According to a third aspect of the present invention, a management system comprises: a position detection unit configured to obtain a position of a work machine; a posture detection unit configured to obtain a posture of the work machine; a work equipment position detection unit configured to obtain a position of at least a portion of a work equipment included in the work machine; a position calculation unit configured to obtain a position of a buried object by using the position of the work machine obtained by the position detection unit, the posture of the work machine obtained by the posture detection unit, and the position of the portion of the work equipment detected by the work equipment position detection unit; and an information acquisition unit configured to acquire buried object information including at least the position of the buried object obtained by the position calculation unit.

According to a fourth aspect of the present invention, in the management system according to any one of the first to third aspects, wherein the buried object information further includes at least one of a size of the buried object, a type of the buried object, and a date at which the buried object information is obtained.

According to a fifth aspect of the present invention, the management system according to any one of the first to fourth aspects, further comprises a storage device configured to store the buried object information.

According to a sixth aspect of the present invention, a management system comprises: a position detection unit configured to obtain a position of a work machine; at least one imaging device configured to image a buried object; and an information acquisition unit configured to acquire an image of the buried object obtained by the imaging device, wherein the information acquisition unit is configured to add, to the image of the buried object, an identifier indicating that the buried object is included in the image and a position and a date of the work machine at a time when the image of the buried object is captured and is configured to store resultant data.

Advantageous Effects of Invention

According to an aspect of the present invention, it is possible to realize at least one of reducing the burden of work for obtaining buried object information and reducing a possibility of damage to a buried object under construction.

DESCRIPTION OF EMBODIMENTS

Modes (embodiments) for carrying out the present invention will be described in detail with reference to the drawings.

First Embodiment

<Overall Structure of Excavator>

Figure 1:
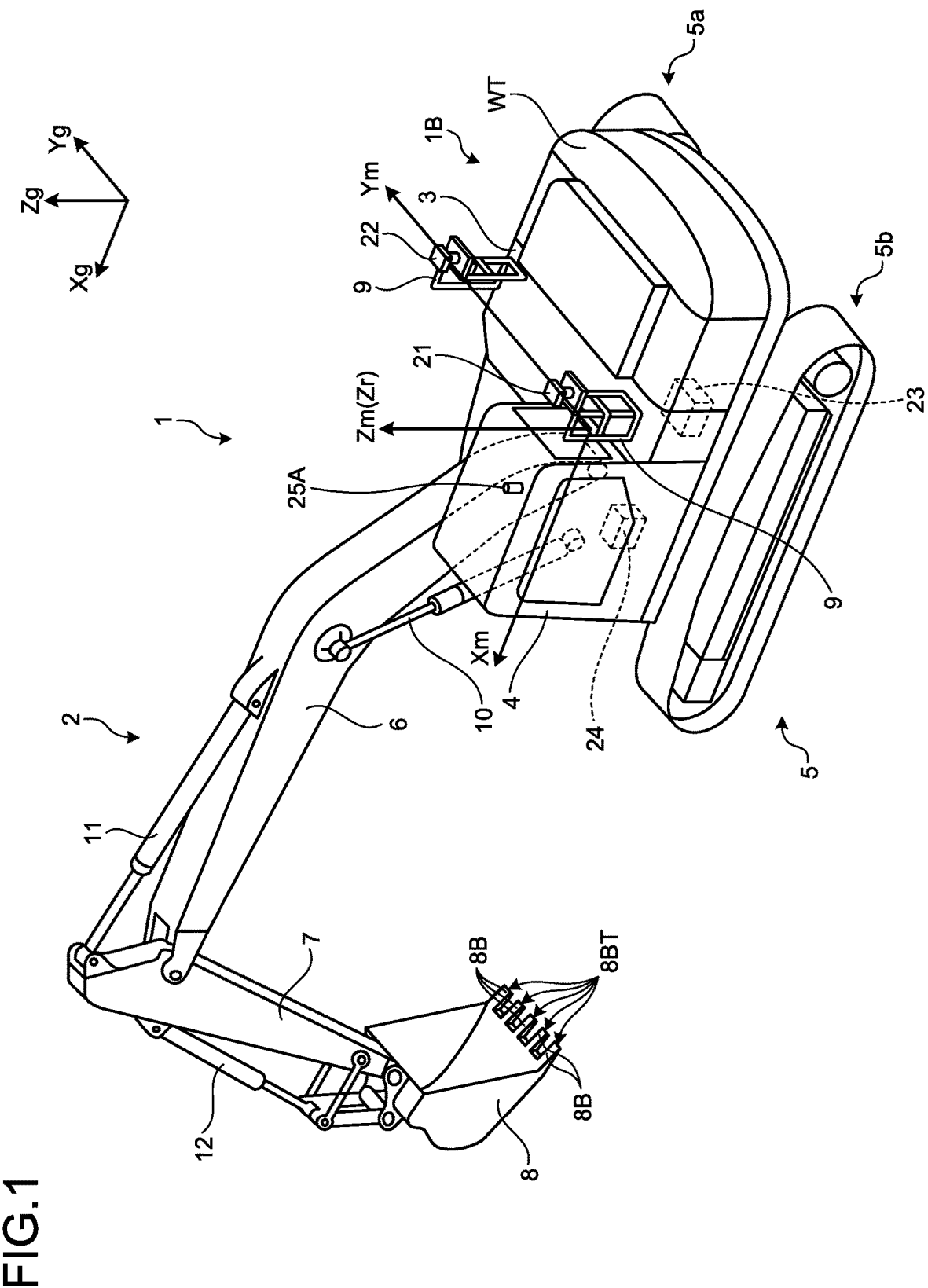
FIG. 1 is a perspective view illustrating an excavator according to a first embodiment.
Figure 2:
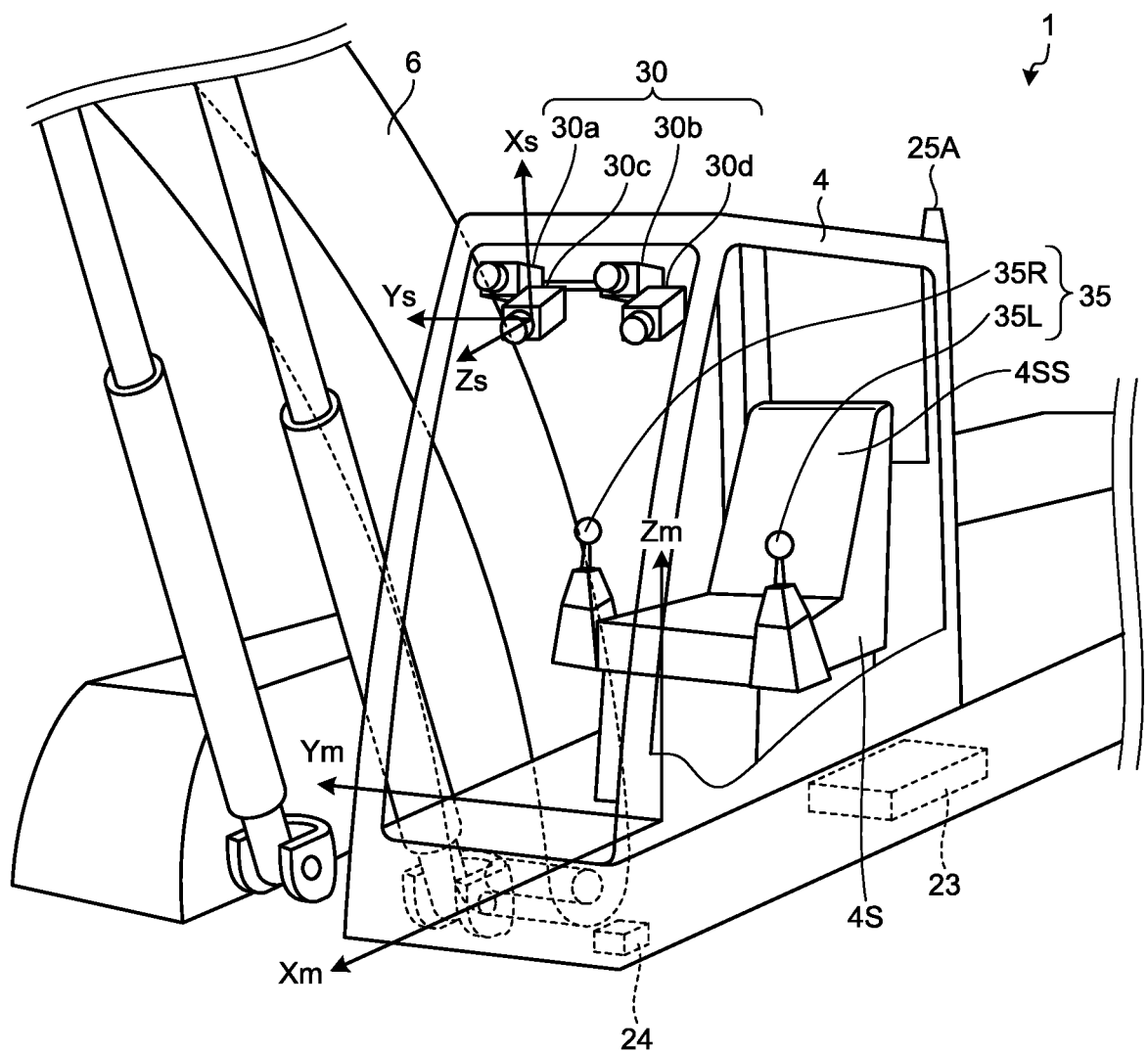
FIG. 2 is a perspective view of a vicinity of a cab of the excavator according to the first embodiment.

FIG. 1 is a perspective view illustrating an excavator 1 according to a first embodiment. FIG. 2 is a perspective view of a vicinity of a cab of the excavator 1 according to the first embodiment. The excavator 1 as a work machine includes a vehicle body 1B and a work equipment 2. The vehicle body 1B includes a swing body 3, a cab 4, and a traveling body 5. The swing body 3 is mounted so as to be swingable on the traveling body 5 around the swing center axis Zr. The swing body 3 accommodates devices such as a hydraulic pump and an engine.

The swing body 3 is swung with the work equipment 2 attached thereto. A handrail 9 is attached to an upper portion of the swing body 3. Antennas 21 and 22 are attached to the handrail 9. The antennas 21 and 22 are antennas for global navigation satellite systems (GNSS, GNSS is a global navigation satellite system). The antennas 21 and 22 are arranged to be separated from each other by a certain distance along a direction parallel to the Ym axis of the vehicle body coordinate system (Xm, Ym, Zm). The antennas 21 and 22 receive GNSS radio waves and output signals corresponding to the received GNSS radio waves. The antennas 21 and 22 may be global positioning system (GPS) antennas.

The cab 4 is mounted on the front portion of the swing body 3. A communication antenna 25A is attached to the roof of the cab 4. The traveling body 5 has crawler belts 5a and 5b. As the crawler belts 5a and 5b rotate, the excavator 1 travels.

The work equipment 2 is attached to the front portion of the vehicle body 1B. The work equipment 2 has a boom 6, an arm 7, a bucket 8 as a work tool, a boom cylinder 10, an arm cylinder 11, and a bucket cylinder 12. In the embodiment, the front side of the vehicle body 1B is the direction side from a backrest 4SS of a cab 4S toward an operating device 35 illustrated in FIG. 2. The rear side of the vehicle body 1B is the direction side from the operating device 35 toward the backrest 4SS of the cab 4S. The front portion of the vehicle body 1B is a portion on the front side of the vehicle body 1B and is a portion on the opposite side of the counterweight WT of the vehicle body 1B. The operating device 35 is a device for operating the work equipment 2 and the swing body 3 and has a right side lever 35R and a left side lever 35L.

The boom cylinder 10, the arm cylinder 11, and the bucket cylinder 12 illustrated in FIG. 1 are hydraulic cylinders driven by a pressure of hydraulic oil, that is, a hydraulic pressure. The boom cylinder 10 drives the boom 6 by expanding and contracting by the hydraulic pressure. The arm cylinder 11 drives the arm 7 by expanding and contracting by the hydraulic pressure. The bucket cylinder 12 drives the bucket 8 by expanding and contracting by the hydraulic pressure.

The bucket 8 has a plurality of blades 8B. The plurality of blades 8B is aligned in the width direction of the bucket 8. The tip of the blade 8B is a cutting edge 8BT. The bucket 8 is an example of a work tool. The work tool is not limited to the bucket 8.

The swing body 3 has a position detection device 23 which is an example of a position detection unit and an inertial measurement unit (IMU) 24 which is an example of a posture detection unit. The position detection device 23 obtains the position of the excavator 1. More particularly, the position detection device 23 detects the current positions of the antennas 21 and 22 and the orientation of the swing body 3 in the global coordinate system (Xg, Yg, Zg) by using the signals acquired from the antennas 21 and 22 and outputs the current position and the orientation. The orientation of the swing body 3 represents the orientation of the swing body 3 in the global coordinate system. The orientation of the swing body 3 can be expressed by, for example, the forward-backward direction of the swing body 3 around the Zg axis of the global coordinate system. The azimuth angle is the rotation angle of the reference axis in the front-rear direction of the swing body 3 around the Zg axis of the global coordinate system. The orientation of the swing body 3 is represented by the azimuth angle.

The IMU 24 obtains the posture of the excavator 1. The posture of the excavator 1 is expressed by a roll angle θr, a pitch angle θp, and an azimuth angle θd. The roll angle θr, the pitch angle θp, and the azimuth angle θd of the excavator 1 are obtained from the acceleration and the angular velocity acting on the excavator 1. The IMU 24 detects the acceleration and the angular velocity acting on the IMU, that is, the acceleration and the angular velocity acting on the excavator 1 to obtain and output the roll angle θr, the pitch angle θp, and the azimuth angle θd of the excavator 1. In this manner, the IMU 24 obtains the posture of the excavator 1. A calculation unit may obtain the roll angle θr, the pitch angle θp, and the azimuth angle θd of the excavator 1 by using the acceleration and the angular velocity detected by the IMU 24. In this case, the IMU 24 and the above-described calculation unit serve as a posture detection unit. The roll angle θr, the pitch angle θp, and the azimuth angle θd of the excavator 1 may be obtained by devices, for example, a gyroscope or the like other than the IMU 24.

<Imaging Device>

As illustrated in FIG. 2, the excavator 1 includes a plurality of imaging devices 30a, 30b, 30c, and 30d in the cab 4. In the following description, in the case of not being distinguished from each other, a plurality of imaging devices 30a, 30b, 30c, and 30d is appropriately referred to as an imaging device 30. Among the plurality of imaging devices 30, an imaging device 30a and an imaging device 30c are arranged on the work equipment 2 side. The type of the imaging device 30 is not limited, but in the embodiment, for example, an imaging device including a couple charged device (CCD) image sensor or a complementary metal oxide semiconductor (CMOS) image sensor is used.

As illustrated in FIG. 2, the imaging device 30a and the imaging device 30b are arranged at predetermined intervals in the cab 4 in the same direction or in different directions. The imaging device 30c and the imaging device 30d are arranged at predetermined intervals in the cab 4 in the same direction or in different directions. Two of the plurality of imaging devices 30a, 30b, 30c, and 30d are combined to configure a stereo camera. In the embodiment, a stereo camera as a combination of the imaging devices 30a and 30b and a stereo camera as a combination of the imaging devices 30c and 30d are configured.

In the embodiment, the imaging device 30a and the imaging device 30b face upward, and the imaging device 30c and the imaging device 30d face downward. At least the imaging device 30a and the imaging device 30c are directed to the front of the excavator 1 and, in this embodiment, the swing body 3. The imaging device 30b and the imaging device 30d may be arranged slightly toward the work equipment 2, that is, toward the imaging device 30a and the imaging device 30c side.

In the embodiment, the excavator 1 includes the four imaging devices 30, but the number of imaging devices 30 that the excavator 1 includes may be at least two, that is, at least one pair and is not limited to four. This is because the excavator 1 stereoscopically images the object by configuring a stereo camera with at least one pair of the imaging devices 30.

The plurality of imaging devices 30a, 30b, 30c, and 30d is arranged in the front side and the upper side of the cab 4. The upper side is a side which is perpendicular to the ground contact plane of the crawler belts 5a and 5b of the excavator 1 and is apart from the ground contact plane. The ground contact plane of the crawler belts 5a and 5b is a plane defined by at least three points which are not present on the same straight line at the portion where at least one of the crawler belts 5a and 5b is in contact with the ground. The lower side is the side opposite to the upper side, that is, the side perpendicular to the ground contact plane of the crawler belts 5a and 5b and directed toward the ground contact plane.

The plurality of imaging devices 30a, 30b, 30c, and 30d stereoscopically images an object existing in the front side of the vehicle body 1B of the excavator 1. The object includes, for example, a portion to be constructed by the excavator 1 from now on, an under-construction portion, and an after-construction portion. In the following, these portions are appropriately referred to as construction objects. In addition to the construction object of the excavator 1, the construction object may be a construction object of a work machine other than the excavator 1 or a construction object of a worker working at the construction site.

The plurality of imaging devices 30a, 30b, 30c, and 30d detects the object from a predetermined position of the excavator 1, that is, from the front side and the upper side in the cab 4 in the first embodiment. In the first embodiment, the object is three-dimensionally measured by using at least the result of stereoscopically imaging by the pair of imaging devices 30. The location where the plurality of imaging devices 30a, 30b, 30c, and 30d is arranged is not limited to the front side and the upper side in the cab 4.

Among the plurality of imaging devices 30a, 30b, 30c, and 30d, for example, the imaging device 30c is set as a reference. Each of the four imaging devices 30a, 30b, 30c, and 30d has a coordinate system. These coordinate systems are appropriately referred to as imaging device coordinate systems. In FIG. 2, only the coordinate system (Xs, Ys, Zs) of the imaging device 30c as a reference is illustrated. The origin of the imaging device coordinate system is, for example, the center of each of the imaging devices 30a, 30b, 30c, and 30d.

In the first embodiment, the imaging ranges of the imaging devices 30a, 30b, 30c, and 30d are larger than the range that construction can be performed by the work equipment 2 of the excavator 1. By doing in this manner, each of the imaging devices 30a, 30b, 30c, and 30d can reliably stereoscopically image the object within the range that the work equipment 2 can excavate.

The above-described vehicle body coordinate system (Xm, Ym, Zm) is a coordinate system with reference to an origin fixed to the vehicle body 1B, that is, the swing body 3 in the first embodiment. In first embodiment, the origin of the vehicle body coordinate system (Xm, Ym, Zm) is, for example, the center of the swing circle of the swing body 3. The center of the swing circle exists on the swing center axis Zr of the swing body 3. The Zm axis of the vehicle body coordinate system (Xm, Ym, Zm) is an axis that becomes the swing center axis Zr of the swing body 3, and the Xm axis is an axis that extends in the forward-backward direction of the swing body 3 and is perpendicular to the Zm axis. The Xm axis is a reference axis in the forward-backward direction of the swing body 3. The Ym axis is an axis that extends in the width direction of the swing body 3 and is perpendicular to the Zm axis and the Xm axis. The vehicle body coordinate system is not limited to the example of the first embodiment. The above-mentioned global coordinate system (Xg, Yg, Zg) is a coordinate system measured by GNSS and is a coordinate system with reference to the origin fixed to the earth.

<Shape Measurement System and Management System>

Figure 3:
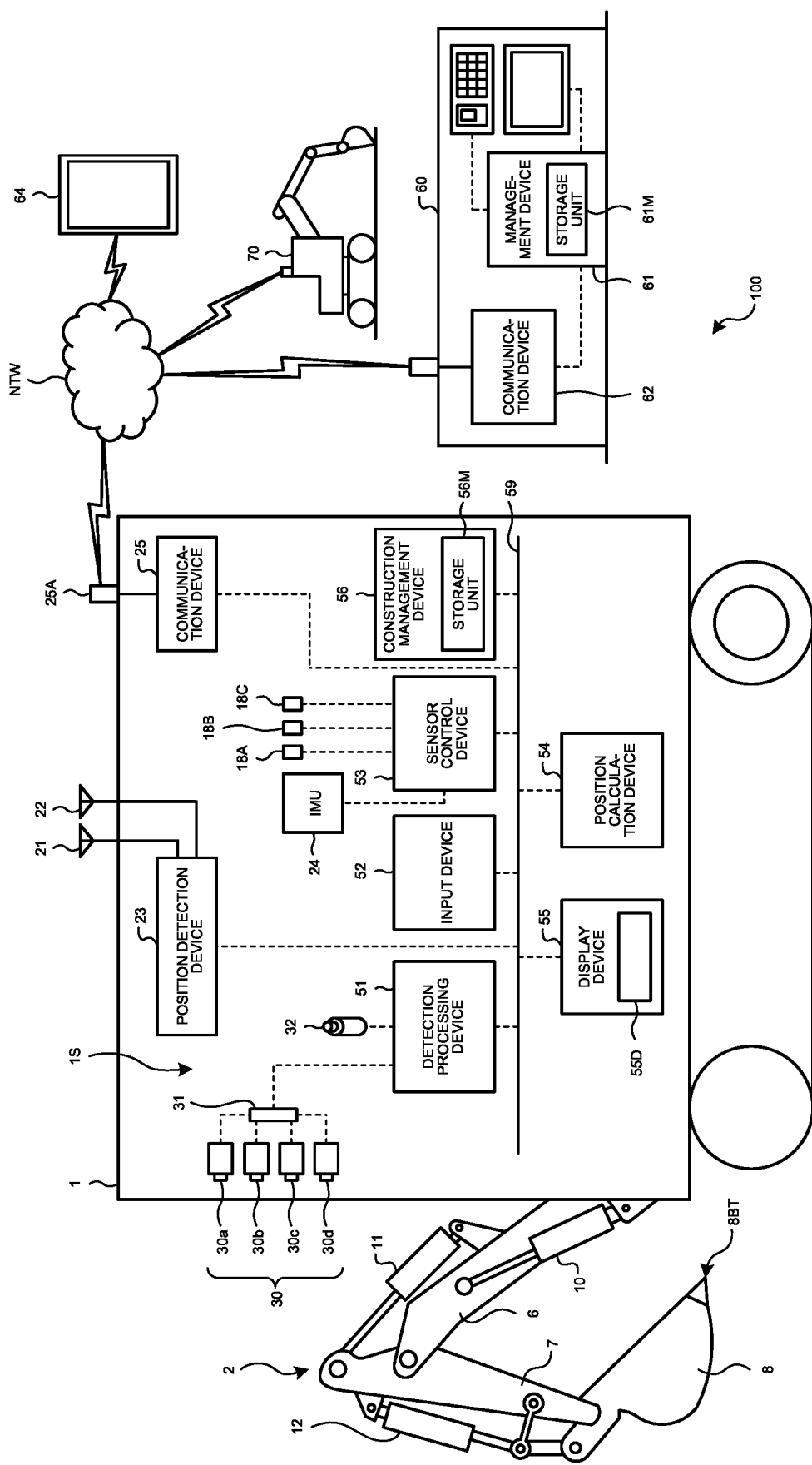
FIG. 3 is a diagram illustrating a shape measurement system and a management system according to first embodiment.

FIG. 3 is a diagram illustrating a shape measurement system 1S and a management system 100 according to the first embodiment. The device configuration of the shape measurement system 1S and the management system 100 illustrated in FIG. 3 is merely an example and is not limited to the device configuration of the first embodiment.

The shape measurement system 1S includes a plurality of imaging devices 30a, 30b, 30c, and 30d and a detection processing device 51. The shape measurement system 1S is provided in the vehicle body 1B of the excavator 1 illustrated in FIG. 1 or in the swing body 3 in the embodiment. The excavator 1 includes a position detection device 23, an IMU 24, a communication device 25, an input device 52, a sensor control device 53, a position calculation device 54, a display device 55, and a construction management device 56 in addition to the shape measurement system 1S.

In the first embodiment, the detection processing device 51, the input device 52, the sensor control device 53, the position calculation device 54, the display device 55, the construction management device 56, the position detection device 23, and the communication device 25 are connected to a signal line 59 to communicate with each other. In the first embodiment, a communication standard using the signal line 59 is controller area network (CAN). However, the present invention is not limited thereto. In the following description, the term "excavator 1" may refer to various electronic devices such as the detection processing device 51 and the input device 52 included in the excavator 1.

Figure 4:
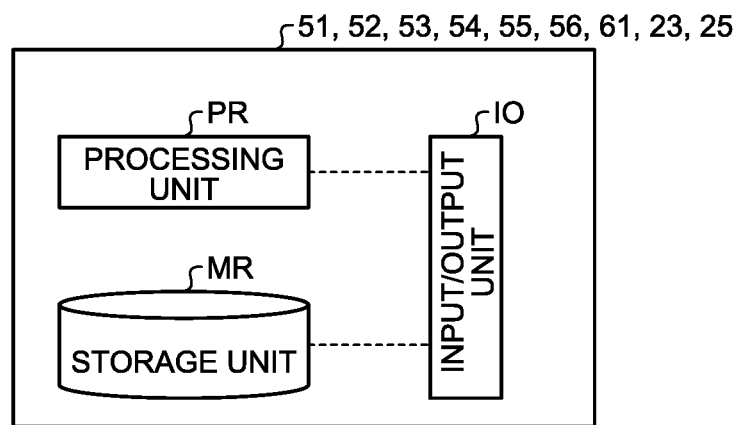
FIG. 4 is a diagram illustrating an example of a hardware configuration of various electronic devices included in an excavator and a management device.

FIG. 4 is a diagram illustrating an example of a hardware configuration of various electronic devices included in the excavator 1 and a management device 61. In the first embodiment, as illustrated in FIG. 4, each of the detection processing device 51, the input device 52, the sensor control device 53, the position calculation device 54, the display device 55, the construction management device 56, the position detection device 23, and the communication device 25 which are various electronic devices included in the excavator 1, and the management device 61 which is arranged outside the excavator 1 has a processing unit PR, a storage unit MR, and an input/output unit IO. The processing unit PR is realized by, for example, a processor such as a central processing unit (CPU) and a memory.

As the storage unit MR, there may be used at least one of a nonvolatile or volatile semiconductor memory such as a random access memory (RAM), a read only memory (ROM), a flash memory, an erasable programmable read only memory (EPROM), and an electrically erasable programmable read only memory (EEPROM), a magnetic disk, a flexible disk, and a magneto-optical disk.

The input/output unit IO is an interface circuit which various electronic devices included in the excavator 1 or the management device 61 use in order to transmit and receive data, signals, and the like to and from other electronic devices.

Various electronic devices included in the excavator 1 and the management device 61 store a computer program for realizing the respective functions in the processing unit PR in the storage unit MR. The processing unit PR realizes the function of each device by reading out and executing the above-mentioned computer program from the storage unit MR. The various electronic devices included in the excavator 1 and the management device 61 may be realized with dedicated hardware, or the respective functions may be realized by cooperation of a plurality of processing circuits. Next, various electronic devices included in the excavator 1 will be described.

The detection processing device 51 of the shape measurement system 1S performs an imaging process in a stereo manner on a pair of images captured by the pair of imaging devices 30 to obtain the position of the object, more specifically, the coordinates of the object in the three-dimensional coordinate system. In this manner, the detection processing device 51 three-dimensionally measures the object by using a pair of images obtained by imaging the same object with at least the pair of imaging devices 30. That is, at least one pair of the imaging device 30 and the detection processing device 51 three-dimensionally measure the object in a stereo manner. The imaging process in a stereo manner is a method of obtaining the distance to the object from two images obtained by observing the same object with two different imaging devices 30. For example, the distance to the object is expressed as a distance image in which the information of the distance to the object is visualized by shading. The distance image corresponds to the shape information indicating the three-dimensional shape of the object.

The detection processing device 51 acquires information of the object detected, that is, imaged by at least the pair of imaging devices 30 and obtains the shape information indicating the three-dimensional shape of the object from the acquired information of the object. In the first embodiment, the information of the object is generated by imaging the object by at least the pair of the imaging devices 30, and the information of the object is output. The information of the object is an image of the object imaged by at least the pair of imaging devices 30. The detection processing device 51 obtains shape information by performing an imaging process in a stereo manner on the image of the object and outputs the shape information. In the embodiment, the construction object or the after-construction object of the excavator 1 having at least the pair of imaging devices 30 is imaged by at least the pair of imaging devices 30. However, the construction object or the after-construction object of another work machine 70 may be imaged by at least the pair of imaging devices 30 included in the excavator 1.

In the first embodiment, the construction object or the after-construction object may be the construction object or the after-construction object of at least one of the excavator 1 having the imaging device 30, the other work machine 70, the work machine other than the excavator 1, and the worker.

The detection processing device 51 obtains the shape information indicating the three-dimensional shape of the object by using the information of the object detected by at least the pair of imaging devices 30 and outputs the shape information. More particularly, the detection processing device 51 obtains the shape information by performing an imaging process in a stereo manner on a pair of images captured by at least the pair of imaging devices 30 and outputs the shape information.

In the first embodiment, the shape measurement system 1S corresponds to an object detection unit which obtains the three-dimensional shape of the object. That is, at least the pair of imaging devices 30 detects the information of the object, and the detection processing device 51 generates the shape information indicating the three-dimensional shape of the object by using the information of the object detected by at least the pair of imaging devices 30 and outputs the shape information.

A hub 31 and an imaging switch 32 are connected to the detection processing device 51. A plurality of imaging devices 30a, 30b, 30c, and 30d is connected to the hub 31. The imaging devices 30a, 30b, 30c, and 30d and the detection processing device 51 may be connected without using the hub 31. The result of detecting the object by the imaging devices 30a, 30b, 30c, and 30d, that is, the result of imaging the object is input to the detection processing device 51 via the hub 31. In the embodiment, the detection processing device 51 acquires the image of the object from the result of imaging by the imaging devices 30a, 30b, 30c, and 30d via the hub 31. In the embodiment, when the imaging switch 32 is operated, at least one pair of imaging devices 30 images the object. The imaging switch 32 is installed in the vicinity of the operating device 35 in the cab 4 illustrated in FIG. 2. The installation location of the imaging switch 32 is not limited thereto.

The input device 52 is a device for issuing commands to, transmitting information to, and changing settings of electronic devices such as the shape measurement system 1S, the sensor control device 53, and the position calculation device 54. The input device 52 is, for example, a key, a pointing device, or a touch panel. However, the present invention is not limited thereto. By providing a touch panel on a screen 55D of the display device 55 to be described later, the display device 55 may have an input function. In this case, the excavator 1 may not have the input device 52.

The sensor control device 53 is connected with sensors for detecting information on the state of the excavator 1 and information on the state of the surroundings of the excavator 1. The sensor control device 53 transforms the information acquired from the sensors into a format that other electronic devices can handle and outputs the transformed information. The information on the state of the excavator 1 is, for example, information on the posture of the excavator 1 and information on the posture of the work equipment 2. In the example illustrated in FIG. 3, the IMU 24, a first angle detection unit 18A, a second angle detection unit 18B, and a third angle detection unit 18C are connected to the sensor control device 53 as sensors that detect information on the state of the excavator 1. However, the sensors are not limited thereto.

In the first embodiment, the first angle detection unit 18A, the second angle detection unit 18B, and the third angle detection unit 18C are, for example, stroke sensors. By detecting the stroke lengths of the boom cylinder 10, the arm cylinder 11, and the bucket cylinder 12, these angle detection units indirectly detect the rotation angle of the boom 6 with respect to the vehicle body 1B, the rotation angle of the arm 7 with respect to the boom 6, and the rotation angle of the bucket 8 with respect to the arm 7, respectively. The position of a portion of the work equipment 2 in the vehicle body coordinate system can be known from the rotation angle of the boom 6 with respect to the vehicle body 1B, the rotation angle of the arm 7 with respect to the boom 6, and the rotation angle of the bucket 8 with respect to the arm 7 detected by the first angle detection unit 18A, the second angle detection unit 18B, and the third angle detection unit 18C and the size of the work equipment 2. For example, the position of a portion of the work equipment 2 is, for example, the position of the cutting edge 8BT of the bucket 8. The first angle detection unit 18A, the second angle detection unit 18B, and the third angle detection unit 18C may be potentiometers or inclinometers instead of the stroke sensor.

For example, among the shape information obtained by the detection processing device 51, the construction management device 56 collects at least one of the shape information of the construction result of the construction that the excavator 1 performs on the construction object and the shape information indicating a current state topography of the object to be constructed from now by the excavator 1 and stores the shape information in a storage unit 56M. The construction management device 56 transmits the shape information stored in the storage unit 56M to the management device 61 or a mobile terminal device 64 via the communication device 25. The construction management device 56 transmits the shape information of the construction result stored in the storage unit 56M to the management device 61 or the mobile terminal device 64 via the communication device 25. The construction management device 56 may collect at least one of the shape information and the target construction information obtained by the detection processing device 51 and transmit the shape information and the target construction information to the management device 61 or the mobile terminal device 64 without storing the shape information and the target construction information in the storage unit 56M. The storage unit 56M corresponds to the storage unit MR illustrated in FIG. 4.

The construction management device 56 may be installed outside the excavator 1, for example, in the management device 61. In this case, the construction management device 56 acquires at least one of the shape information of the construction result from the excavator 1 via the communication device 25 and the shape information indicating the current state topography of the object to be constructed from now by the excavator 1.

The construction result is, for example, shape information obtained by at least one pair of imaging devices 30 imaging the after-construction object and by the detection processing device 51 performing an imaging process in a stereo manner on the imaging result. Hereinafter, in order to distinguish the shape information indicating the current state topography of the object to be constructed from now by the excavator 1 from the construction result, the shape information is appropriately referred to as current state topography information.

As described above, in some cases, the shape information may be the shape information of the object that has been constructed by at least one of the excavator 1, the other work machine 70, and the worker; and in the other cases, the shape information may be the shape information of the object that is to be constructed from now by at least one of the excavator 1, the other work machine 70, and the worker.

For example, the construction management device 56 collects the construction result after completion of the work of the day and transmits the construction result to at least one of the management device 61 and the mobile terminal device 64 or collects the construction results several times during the work of the day and transmits the construction results to at least one of the management device 61 and the mobile terminal device 64. For example, before working in the morning, the construction management device 56 may transmit the before-construction shape information, that is, the current state topography information to the management device 61 or the mobile terminal device 64.

The display device 55 displays information on the excavator 1 on a screen 55D of a display such as a liquid crystal display panel or displays a guidance image for construction on the screen 55D. In addition to this, in the first embodiment, the display device 55 obtains the position of the work equipment 2, for example, the position of the cutting edge 8BT of the bucket 8.

The display device 55 acquires the current positions of the antennas 21 and 22 detected by the position detection device 23, the rotation angles detected by the first angle detection unit 18A, the second angle detection unit 18B, and the third angle detection unit 18C, the size of the work equipment 2 stored in the storage unit MR, and the output data of the IMU 24 and obtains the position of the cutting edge 8BT of the bucket 8 by using these data. In the first embodiment, the display device 55 obtains the position of the cutting edge 8BT of the bucket 8, but the position of the cutting edge 8BT of the bucket 8 may be obtained by a device other than the display device 55.

The communication device 25 is a communication unit according to the first embodiment. The communication device 25 communicates with at least one of the management device 61 of a management facility 60, the other work machine 70, and the mobile terminal device 64 via a communication line NTW and exchanges information with each other. Among the information exchanged by the communication device 25, as the information to be transmitted from the excavator 1 to at least one of the management device 61, the other work machine 70, and the mobile terminal device 64, there is the buried object information. The buried object information is information including at least the position of the buried object which is an object buried in the ground. The position of the buried object is a three-dimensional position. The buried object information may be transmitted by the communication device 25 after being stored in the storage unit of the detection processing device 51, the storage unit of the input device 52, or the storage unit 56M of the construction management device 56 or may be transmitted without being stored. In addition, the buried object information may include information on the type or characteristic of the buried object. For example, the buried object information may be information indicating that a certain buried object is a water pipe.

In the first embodiment, the communication device 25 communicates by wireless communication. For this reason, the communication device 25 has an antenna 25A for wireless communication. The mobile terminal device 64 is, for example, carried by a manager who manages the work of the excavator 1, but the mobile terminal device is not limited thereto. The other work machine 70 has a function of communicating with at least one of the excavator 1 and the management device 61. The communication device 25 may communicate with at least one of the management device 61 of the management facility 60, the other work machine 70, and the mobile terminal device 64 via wired communication so as to exchange information with each other.

The management system 100 includes the position detection device 23, the IMU 24, the shape measurement system 1S, and the position calculation device 54 of the excavator 1 and the management device 61 of the management facility 60. In the management facility 60, the management device 61 and a communication device 62 are arranged. The management device 61 communicates with at least the excavator 1 via the communication device 62 and the communication line NTW. The management device 61 may communicate with the mobile terminal device 64 or may communicate with another work machine 70. A wireless communication device may be mounted so that the excavator 1 and the other work machine 70 can directly perform wireless communication. At least one of the excavator 1 and the other work machine 70 may be equipped with an electronic device capable of executing a process executed by the management device 61 or the like of the management facility 60. In the first embodiment, the electronic device capable of executing a process executed by the management device 61 or the like of the management facility 60 is the construction management device 56 of the excavator 1.

The management device 61 acquires at least the buried object information from the excavator 1 and manages the position where the buried object is buried, the size of the buried object, the type of the buried object, and the like.

<Imaging of Object and Generation of Shape Information>

Figure 5:
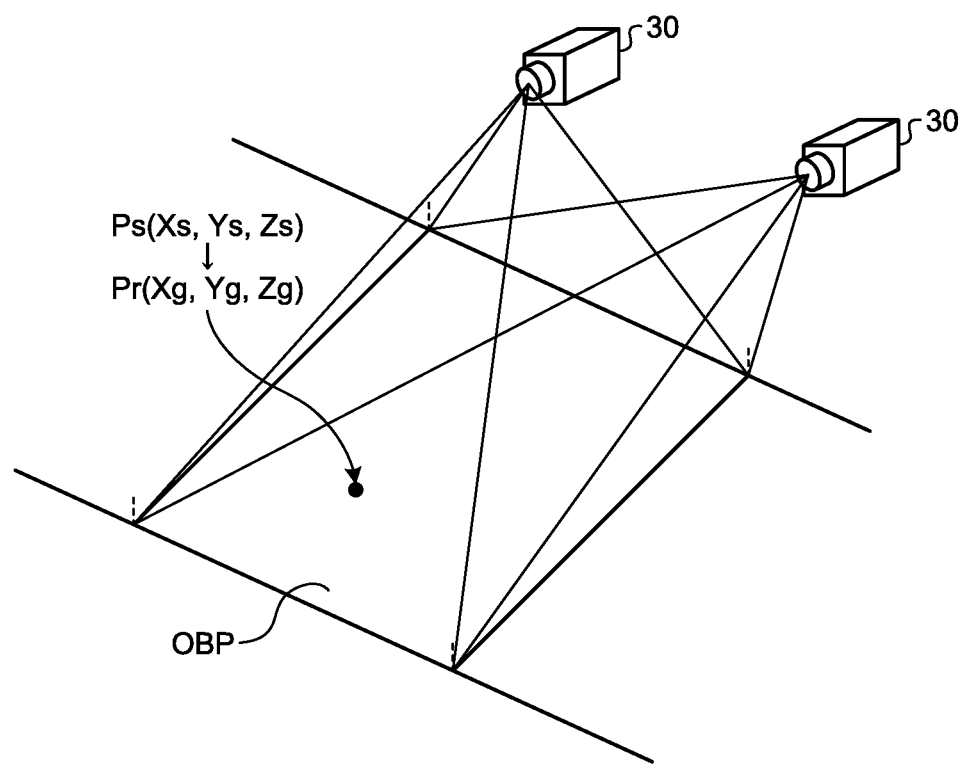
FIG. 5 is a diagram for describing shape information obtained by the shape measurement system according to the first embodiment.

FIG. 5 is a diagram illustrating shape information obtained by the shape measurement system 1S according to the first embodiment. In the first embodiment, the object OBP to be imaged by the shape measurement system 1S is located in the front side of the excavator 1. The shape information is obtained from the object OBP. As the object OBP, there is exemplified, for example, a buried object buried in the ground and a construction object of the excavator 1. In the case of generating the shape information from the object OBP, the shape measurement system 1S causes at least one pair of the imaging devices 30 to image the object OBP. In the first embodiment, when the operator of the excavator 1 operates the imaging switch 32 illustrated in FIG. 3 to input an imaging instruction to the detection processing device 51, the detection processing device 51 causes at least one pair of imaging devices 30 to image the object OBP.

The detection processing device 51 of the shape measurement system 1S performs an imaging process in a stereo manner on the image of the object OBP captured by at least one pair of the imaging devices 30 to obtain the position information of the object OBP, that is, the three-dimensional shape of the object OBP in the first embodiment. Since the three-dimensional shape of the object OBP obtained by the detection processing device 51 is information in the coordinate system of the imaging device 30, the three-dimensional shape of the object OBP is transformed into position information in the global coordinate system. The position information of the object in the global coordinate system, for example, the object OBP is shape information. In the first embodiment, the shape information is information including at least one position Pr (Xg, Yg, Zg) of the surface of the object OBP in the global coordinate system. The position Pr (Xg, Yg, Zg) is a coordinate in the global coordinate system and is three-dimensional position information.

The position calculation device 54 transforms the three-dimensional shape of the object OBP obtained from the image captured by at least the pair of imaging devices 30, that is, the position represented by three-dimensional coordinates into the position in the global coordinate system. The position of the surface of the object OBP includes the position of the surface of the object OBP before, after, and under construction.

The detection processing device 51 outputs the three-dimensional shape of the object OBP over the entire area of the object OBP imaged by at least a pair of imaging devices 30. The three-dimensional shape of the object OBP is output as the position Pr on the surface of the object OBP. The position calculation device 54 which is a position calculation unit obtains the position Pr (Xg, Yg, Zg) of the object OBP in the global coordinate system by using the position of the excavator 1 obtained by the position detection device 23 which is a position detection unit, the posture of the excavator 1 obtained by the IMU 24 which is a posture detection unit, and the three-dimensional shape of the object OBP obtained by the shape measurement system 1S and outputs the position Pr (Xg, Yg, Zg). That is, the position calculation unit transforms the position of the object OBP, that is, the three-dimensional position in the first embodiment from the imaging device coordinate system into the position in the global coordinate system and outputs the position.

In obtaining the position Pr (Xg, Yg, Zg) in the global coordinate system, the position calculation device 54 transforms the position Ps (Xs, Ys, Zs) of the object OBP in the imaging device coordinate system into the position Pr (Xg, Yg, Zg) in the global coordinate system. The position Ps (Xs, Ys, Zs) of the object OBP in the imaging device coordinate system is obtained by at least the pair of imaging devices 30 performing imaging and by the detection processing device 51 performing an imaging process in a stereo manner. The position calculation device 54 executes transformation from the imaging device coordinate system into the global coordinate system by using the positions of the antennas 21 and 22 of the excavator 1 in the global coordinate system obtained by the position detection device 23 and the roll angle θr, the pitch angle θp, and the azimuth angle θd of the excavator 1 obtained by the IMU 24.

The object OBP detected by the shape measurement system 1S includes a portion to be constructed from now by the excavator 1 and a portion after being constructed by the excavator 1. The portion after being constructed by the excavator 1 includes the buried object. The shape measurement system 1S and the position calculation device 54 obtain and output the position of the object in the global coordinate system by the above-described method.

The position Pr (Xg, Yg, Zg) in the global coordinate system obtained by the position calculation device 54 is, for example, stored in the storage unit 56M of the construction management device 56, transmitted to the management device 61 via the communication device 25, or transmitted to the mobile terminal device 64. The position Pr (Xg, Yg, Zg) transmitted to the management device 61 is stored in, for example, a storage unit 61M. The storage unit 61M corresponds to the storage unit MR illustrated in FIG. 4. In a case where the position Pr (Xg, Yg, Zg) is transmitted to the mobile terminal device 64, the data file may be stored in the storage unit of the mobile terminal device 64.

<Management of Buried Object>

Figure 6:
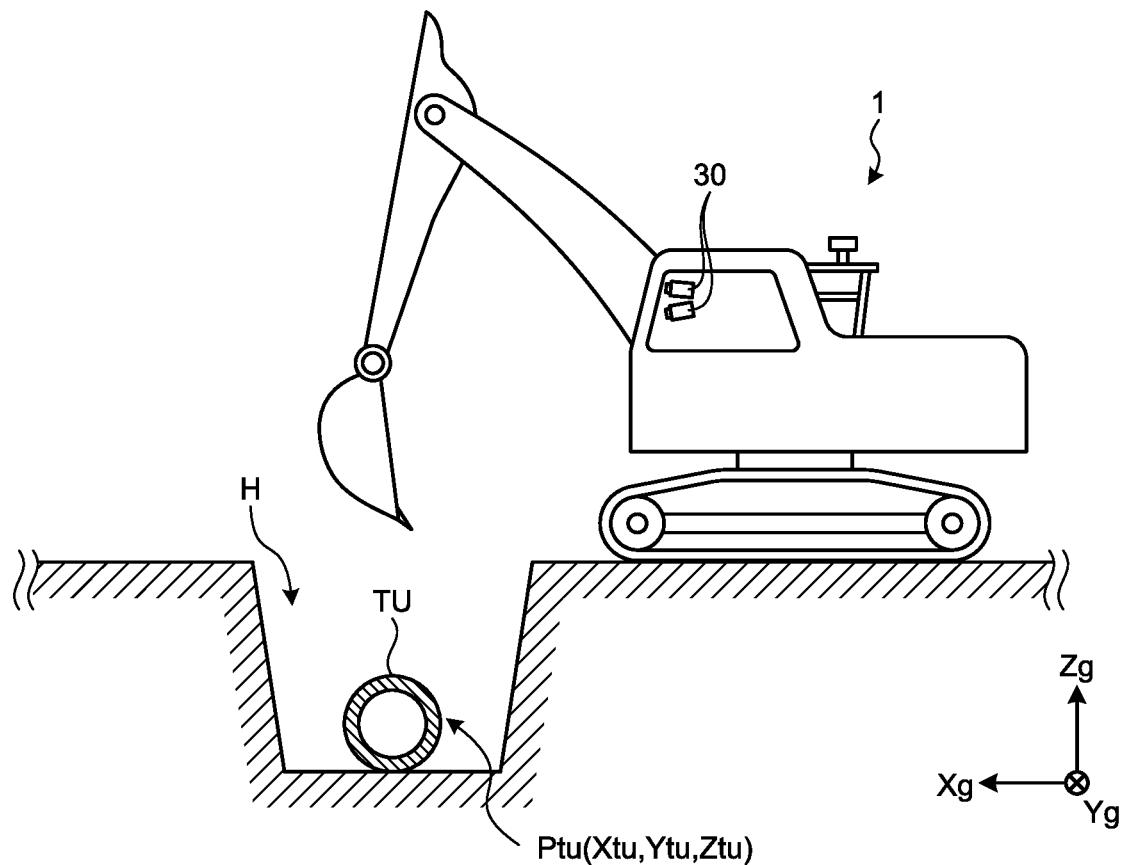
FIG. 6 is a diagram illustrating an example of a state in which a buried object is installed in a hole.

FIG. 6 is a diagram illustrating an example of a state in which the buried object TU is installed in a hole H. The buried object TU is installed in the hole H excavated by the excavator 1. As the buried object TU, there are exemplified pipes such as a water pipe, a gas pipe, and a drain pipe. Besides, various cables such as wires and communication lines are buried objects TU. The buried object TU is not limited thereto, but generally, any objects buried in the ground may be the buried object TU.

If the work is performed without knowing that the buried object TU exists in the ground at the time of constructing the object by the excavator 1, there is a possibility of damage to the buried object TU. In order to check whether the buried object TU is buried as designed, it is necessary for the worker to measure the position, gradient, and the like of the buried object TU. The measured position, gradient, and the like of the buried object TU are managed as a database and used for checking where the buried object TU is buried at the time of construction. Even in a case where there is no worker, it is desirable to improve the work efficiency by measuring the position, gradient, and the like of the buried object TU.

In the first embodiment, the management system 100 acquires the buried object information including at least the position Ptu (Xtu, Ytu, Ztu) of the buried object TU obtained by the position detection device 23, the IMU 24, the shape measurement system 1S, and the position calculation device 54. More particularly, the management device 61 of the management system 100 acquires the buried object information and stores the buried object information in the storage unit 61M. Since the buried object information includes the position Ptu (Xtu, Ytu, Ztu) of the buried object TU, the position Ptu (Xtu, Ytu, Ztu) of the buried object TU is obtained by referring to the buried object information stored in the storage unit 61M.

For example, the management device 61 or the construction management device 56 of the excavator 1 searches for the buried object information stored in the storage unit 61M by using the position of the place to be constructed from now by the excavator 1 as a key, so that it is possible to grasp whether or not the buried object TU exists in the ground of the place to be constructed from now. Since the position Ptu (Xtu, Ytu, Ztu) of the buried object TU included in the buried object information is three-dimensional coordinates in the global coordinate system (Xg, Yg, Zg), the depth at which the buried object TU is buried is known by referring to the buried object information. For example, the display device 55 of the excavator 1 acquires the information indicating that the buried object TU is buried in the place to be constructed from now and the position of the buried object TU from the management device 61 or the construction management device 56 of the excavator 1 and displays the information and the position of the buried object TU on the screen 55D.

Through this process, the operator of the excavator 1 can grasp the existence of the buried object TU at the place to be constructed from now and the depth of the buried object TU. As a result, it is possible to reduce a possibility of damage to the buried object TU caused by performing the work without knowing that the buried object TU exists in the ground. In addition, the buried object information is obtained from the three-dimensional shape of the buried object TU obtained by at least the pair of imaging devices 30 and the detection processing device 51 three-dimensionally measuring the buried object TU in a stereo manner. Therefore, even in a case where there is no worker, since it is possible to measure the position, gradient, and the like of the buried object TU, it is possible to improve the work efficiency. The gradient of the buried object TU is obtained as long as a plurality of positions of the buried object TU can be obtained.

Figure 7:
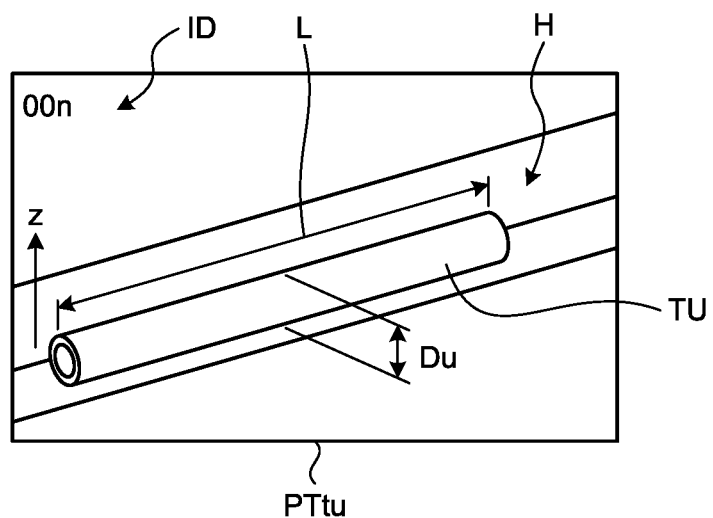
FIG. 7 is a view illustrating an example of a distance image of a buried object imaged by a pair of imaging devices.

FIG. 7 is a diagram illustrating an example of the distance image PTtu of the buried object TU imaged by the pair of imaging devices 30. The distance image PTtu is a distance image indicating the distance from the pair of imaging devices 30 to the object obtained by the pair of imaging devices 30 performing imaging and by the detection processing device 51 performing an imaging process in a stereo manner. The distance image is a three-dimensional data. In the distance image PTtu, elements such as meshes are provided at predetermined intervals. Each element includes information on the three-dimensional position in the imaging device coordinate system. The coordinate transformation of the distance image PTtu is performed, so that the three-dimensional position of each element is transformed into a three-dimensional position in the global coordinate system.

The position of the buried object TU included in the buried object information is a three-dimensional position included in the element corresponding to the buried object TU in the distance image PTtu. The distance image PTtu obtained from the image obtained by imaging the buried object TU includes the position information of the buried object TU. That is, the distance image PTtu is obtained from the image obtained by imaging the buried object TU, so that the three-dimensional position of the buried object TU is obtained. By specifying the element corresponding to the buried object TU in the distance image PTtu, the three-dimensional position of the buried object TU is specified. The position of the buried object TU may be the representative position of the buried object TU, may be the position of each element of the buried object TU, or may be the position of a portion of elements of the buried object TU. For example, if the buried object is any pipe as illustrated in FIG. 7, the position of the straight line passing through the center of the pipe may be set as the position of the buried object TU. Alternatively, the upper end portion in the z direction of the pipe may be set as the position of the pipe.

As illustrated in FIG. 7, in the distance image PTtu, the surrounding ground is displayed besides the buried object TU. The element corresponding to the buried object TU may include the information indicating that the element is a buried object, that is, the buried object information, and the element corresponding to the surrounding ground may not include the buried object information.

The distance image includes the position Ptu of the buried object TU in the element corresponding to the buried object TU. The position Ptu of the buried object TU is obtained from the coordinates of the buried object TU included in the element corresponding to the buried object TU in the distance image PTtu. Therefore, the buried object information may include at least one of the distance image itself and the position Ptu of the buried object TU which has been extracted from the distance image.

In the first embodiment, the detection processing device 51 assigns an identifier ID to the distance image PTtu of the buried object TU. That is, the detection processing device 51 corresponds to an identifier assignment unit. By assigning the identifier ID to the distance image PTtu of the buried object TU, the distance image PTtu of the buried object TU is specified from a plurality of distance images PTtu obtained by the imaging device 30 performing imaging and being subjected to an imaging process in a stereo manner.

In the first embodiment, the position calculation device 54 may extract elements corresponding to the buried object TU from the distance image PTtu of the buried object TU generated by the detection processing device 51 or the image before being processed by the detection processing device 51 and may obtain the position and size of the buried object TU by using the extracted elements. The position calculation device 54 extracts the elements corresponding to the buried object TU by performing an edge extraction process, a pattern recognition process, or the like on the distance image PTtu of the buried object TU or the image before being processed by the detection processing device 51. As the size of the buried object TU, there is exemplified the diameter Du and the length L of the buried object TU in a case where the buried object TU is a pipe.

The position Ptu (Xtu, Ytu, Ztu) of the buried object TU obtained by the position calculation device 54 is acquired by the construction management device 56. The construction management device 56 generates the buried object information including at least the position Ptu (Xtu, Ytu, Ztu) of the buried object TU and stores the buried object information in the storage unit 56M or transmits the buried object information to the management device 61 of the management facility 60 via the communication device 25. The management device 61 stores the buried object information received from the construction management device 56 of the excavator 1 in the storage unit 61M and generates a database of the buried objects TU. In this manner, the management device 61 corresponds to an information acquisition unit which acquires the buried object information obtained by the construction management device 56. In a case where the mobile terminal device 64 acquires the buried object information from the construction management device 56, the mobile terminal device 64 corresponds to an information acquisition unit. In a case where the construction management device 56 stores the buried object information in the storage unit 56M, the storage unit 56M corresponds to an information acquisition unit.

Figures 8, 9:
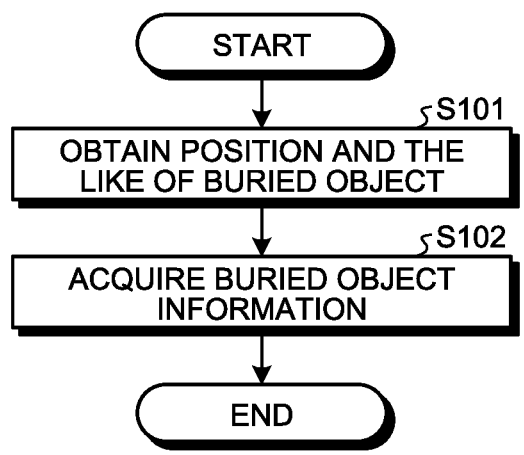
FIG. 8 is a diagram illustrating an example of a database of buried objects including buried object information.
FIG. 9 is a flowchart illustrating a process example of a management method according to the first embodiment.

FIG. 8 is a diagram illustrating an example of a database DB of the buried object TU including the buried object information IFd. The database DB is stored in, for example, the storage unit 61M of the management device 61. The database DB includes a plurality of pieces of buried information IFd1, IFd2, . . . , IFdn. In the first embodiment, the buried object information IFd includes at least one of the position Ptu and the distance image PTtu of the buried object TU and further includes the identifier ID, the type TY of the buried object TU, the size Sz of the buried object TU, and the date DT at which the buried object information IFd is obtained. The buried object information IFd may include at least one of the position Ptu and the distance image PTtu of the buried object TU and may further include the identifier ID, the type TY of the buried object TU, and the like as additional information. The additional information is not limited to the identifier ID, the type TY of the buried object TU, the size Sz of the buried object TU, and the date DT at which the buried object information IFd is obtained.

In the first embodiment, the position calculation device 54 of the excavator 1 automatically obtains the position Ptu of the buried object TU. However, the management device 61 may automatically obtain the position Ptu of the buried object TU. In this case, the management device 61 extracts the elements corresponding to the buried object TU from the distance image PTtu included in the buried object information IFd and obtains the position Ptu of the buried object TU from the position of each element. In addition, the mobile terminal device 64 may extract the elements corresponding to the buried object TU from the distance image PTtu included in the buried object information IFd and obtain the position Ptu of the buried object TU from the position of each element.

The position Ptu of the buried object TU may be obtained by the operator of the management device 61 designating the buried object TU existing in the distance image PTtu of the buried object TU or the image before being processed by the detection processing device 51. More particularly, the operator of the management device 61 designates the buried object TU existing in the distance image PTtu of the buried object TU or the image before being processed by the detection processing device 51. The management device 61 obtains the position Ptu of the buried object TU from the elements existing in the designated range. The management device 61 writes the obtained position Ptu of the buried object TU into the database DB.

The construction management device 56 of the excavator 1 transmits at least one of the position Ptu and the distance image PTtu of the buried object TU as the buried object information IFd to the management device 61 or the mobile terminal device 64. In addition, the construction management device 56 may further transmit the identifier ID, the type TY of the buried object TU, the size Sz of the buried object TU, and the date DT at which the buried object information IFd is obtained to the management device 61 or the mobile terminal device 64. In addition, the construction management device 56 may transmit the distance image PTtu of the buried object TU as the buried object information IFd to the management device 61 or the mobile terminal device 64, and the management device 61 or the mobile terminal device 64 may obtain the position Ptu of the buried object TU, the type TY of the buried object TU, and the size Sz of the buried object TU from the distance image PTtu. In this case, when transmitting the buried object information IFd, the construction management device 56 may add, to the buried object information IFd, the date at which the distance image PTtu is obtained and the identifier ID and transmit the date and the identifier ID. In addition, the management device 61 or the mobile terminal device 64 sets the timing of receiving the distance image PTtu of the buried object TU from the construction management device 56 as the date DT at which the buried object information IFd is obtained and assigns the identifier ID to the received distance image PTtu.

The database DB is updated every time the management device 61 receives the buried object information IFd transmitted from the plurality of excavators 1. The excavator 1, more particularly, the construction management device 56 accesses the management device 61 to acquire the buried object information IFd before construction, so that it is possible to determine whether a buried object TU exists in the place to be constructed or, in a case where the buried object TU exists, it is possible to determine to what extent of the depth the buried object TU exists. More particularly, if the buried object information IFd has the identifier ID or the type TY of the buried object TU and the position Ptu or the distance image PTtu of the buried object TU, it is possible to determine from the buried object information IFd where the buried object TU exists. Another work machine 70 which is a work machine other than the excavator 1 which stores the buried object information IFd in the storage unit 56M of the construction management device 56 accesses the management device 61 before construction, so that it is possible to acquire the buried object information IFd. In addition, the shape measurement system 1S included in the excavator 1 measures the buried object TU at a plurality of construction sites, so that it is possible to acquire the buried object information IFd at the plurality of construction sites.

FIG. 9 is a flowchart illustrating a process example of a management method according to the first embodiment. This management method is executed at the time of obtaining the buried object information IFd. In step S101, the position calculation device 54 of the excavator 1 obtains the position of the buried object TU by using the detection values of the shape measurement system 1S, the position detection device 23, and the IMU 24.

As described above, the distance image PTtu including the buried object TU includes the position Ptu of the buried object TU. For this reason, the position calculation device 54 obtains the position Ptu of the buried object TU in the global coordinate system, that is, the three-dimensional position in the first embodiment by transforming the distance image PTtu including the position Ptu of the buried object TU into the global coordinate system. In addition to the above-described coordinate transformation, the position calculation device 54 may extract the element corresponding to the buried object TU from the distance image PTtu including the buried object TU and set the three-dimensional position of the extracted element as the position Ptu of the buried object TU.

For example, the position calculation device 54 may extract an edge or a characteristic portion of the buried object TU from the distance image PTtu including the buried object TU and may set the three-dimensional position of the extracted edge or characteristic portion and the element existing inside the edge or characteristic portion as the position Ptu of buried object TU. In addition, the position calculation device 54 may display, for example, the distance image PTtu on the screen 55D of the display device 55 and may set the three-dimensional position of the element existing in the range of the buried object TU designated by the operator through the input device 52 as the position of the buried object TU. The element including the buried object TU may be extracted from the distance image PTtu or may be extracted from the image before being subjected to an imaging process in a stereo manner. If the position Ptu of the buried object TU in the distance image PTtu is known, the size Sz of the buried object TU can also be obtained.

The construction management device 56 generates the buried object information IFd including the obtained position Ptu of the buried object TU. In step S102, the management device 61 acquires the buried object information IFd from the excavator 1 and stores the buried object information in the storage unit 61M.

Figure 10:
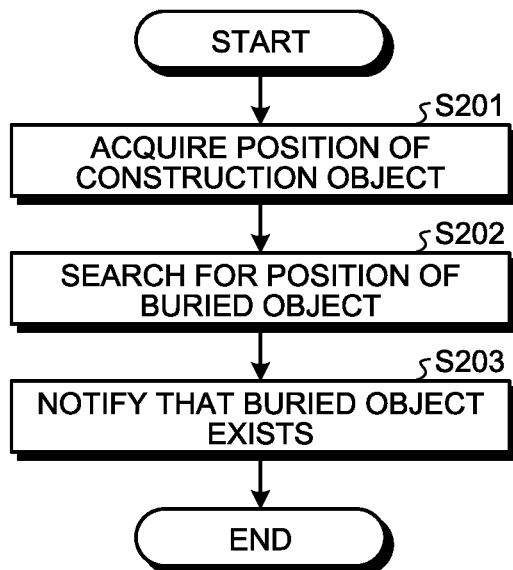
FIG. 10 is a flowchart illustrating another process example of the management method according to the first embodiment.

FIG. 10 is a flowchart illustrating another process example of the management method according to the first embodiment. This management method is for the case of using the buried object information IFd when the excavator 1 performs construction. First, the construction management device 56 of the excavator 1 causes the pair of imaging devices 30 to image the construction object. The position calculation device 54 obtains the position of the construction object by using the detection values of the shape measurement system 1S, the position detection device 23, and the IMU 24. In step S201, the construction management device 56 acquires the position of the construction object obtained by the position calculation device 54.

In step S202, the position Ptu of the buried object TU is searched with the position of the construction object obtained in step S201 as a key. More particularly, the construction management device 56 supplies the position of the construction object obtained in step S201 to the management device 61. The management device 61 searches the database DB stored in the storage unit 61M by using the received position of the construction object as a key. In this case, by using the X and Y coordinates of the position of the construction object as a key, the database DB is searched. The management device 61 supplies the search result to the construction management device 56.

In a case where the construction management device 56 acquires, from the management device 61, the search result that the buried object TU is buried at the position of the construction object, in step S203, the construction management device 56 notifies the fact that the buried object TU exists at the position of the construction object on the display device 55. In a case where the construction management device 56 acquires, from the management device 61, the search result that the buried object TU is not buried at the position of the construction object, the construction management device 56 notifies the fact that no buried object TU exists at the position of the construction object on the display device 55.

In the first embodiment, the detection processing device 51 realizes the three-dimensional measurement by performing an imaging process in a stereo manner on the image captured by the imaging device 30, However, the present invention is not limited thereto. For example, the detection processing device 51 may transmit the image captured by the imaging device 30 to the outside, and the external management device 61 or the external mobile terminal device 64 may execute an imaging process in a stereo manner.

The work equipment 2 of the excavator 1 may be controlled on the basis of the buried object information IFd. For example, since the position at which the buried object TU is buried can be known from the buried object information IFd, the work equipment 2 is controlled so as not to be in contact with the buried object TU. More particularly, descending of the boom 6 of the work equipment 2 is stopped on the basis of the distance between the cutting edge 8BT of the bucket 8 of the work equipment 2 and the buried object TU so that the cutting edge 8BT of the bucket 8 is not in contact with the buried object TU.

In the first embodiment, the buried object information IFd is transmitted from the construction management device 56 to at least one of the management device 61 and the mobile terminal device 64 via the communication device 25. However, the present invention is not limited thereto. For example, the buried object information IFd may be transmitted through a storage device. In addition, the construction management device 56 and at least one of the management device 61 and the mobile terminal device 64 may be connected with each other by wire, and the buried object information IFd may be transmitted to at least one of the management device 61 and the mobile terminal device 64 via this wire.

In the first embodiment, each element of the distance image PTtu is transformed into a position in the global coordinate system by the position calculation device 54 of the excavator 1, so that the three-dimensional position of the buried object TU in the global coordinate system can be obtained by the position calculation device 54. However, the transformation into the global coordinate system may be executed by a device other than the position calculation device 54. For example, the management device 61 or the mobile terminal device 64 may perform the transformation into the global coordinate system to obtain the three-dimensional position of the buried object TU. In this case, the management device 61 or the mobile terminal device 64 acquires the distance image PTtu including the position of the imaging device coordinate system or the position of the vehicle body coordinate system from the construction management device 56 and the detection values of the position detection device 23 and the IMU 24. In addition, the management device 61 or the mobile terminal device 64 may transform the position included in each element of the distance image PTtu into the position in the global coordinate system by using the acquired information, extract the elements corresponding to the buried object TU from the distance image PTtu including the buried object TU, and set the three-dimensional position of the extracted element as the position of the buried object TU. In this case, the management device 61 or the mobile terminal device 64 realizes the function of the position calculation unit.

For example, the management device 61 or the mobile terminal device 64 can extract an edge or a characteristic portion of the buried object TU from the distance image PTtu including the buried object TU and set the three-dimensional position of the extracted edge or characteristic portion and the element existing inside the edge or characteristic portion as the position of the buried object TU. In addition, the management device 61 or the mobile terminal device 64 can also set, for example, the three-dimensional position of the element existing in the range of the buried object TU designated by the operator as the position of the buried object TU.

In the first embodiment, the shape measurement system 1S of the excavator 1 may transmit, to the management device 61 or the mobile terminal device 64, an image (hereinafter, appropriately referred to as a before-processing image) of the buried object TU which has been captured by at least one imaging device 30 and has not been yet subjected to an imaging process in a stereo manner without obtaining the distance image PTtu, that is, without obtaining the three-dimensional position and information (hereinafter, appropriately referred to as imaging-time information) at the time when the before-processing image is captured. The storage unit 61M of the management device 61 or the storage unit of the mobile terminal device 64 acquires the before-processing image and stores the before-processing image with the imaging-time information added thereto. The storage unit 61M of the management device 61 or the storage unit of the mobile terminal device 64 corresponds to an information acquisition unit.

The imaging-time information includes at least an identifier indicating that a buried object is included in the image, a position of the excavator 1 at the time of imaging, and a date. The imaging-time information may further include other information. The other information is, for example, an identifier indicating a construction site, a posture of the excavator 1, and the like. The management device 61 or the mobile terminal device 64, which receives the image before being subjected to an imaging process in a stereo manner and the information when the image is captured, obtains the distance image PTtu and the buried object information IFd on the basis of the received image and information.

In the first embodiment, the object detection unit is a stereo camera including at least the pair of imaging devices 30, but the present invention is not limited thereto. For example, the object detection unit may be a laser scanner. The object detection unit may be mounted on a drone. In this case, the information of the buried object TU detected by the object detection unit mounted on the drone is transmitted to, for example, the shape measurement system 1S by communication.

In the first embodiment, the position calculation device 54 obtains the position Ptu of the buried object TU, and the construction management device 56 generates the buried object information IFd. However, the present invention is not limited thereto. The position Ptu of the buried object TU and the buried object information IFd may be obtained by another electronic device included in the excavator 1 or may be obtained by the management device 61 and the mobile terminal device 64.

In the first embodiment, the detection processing device 51 assigns the identifier ID to the distance image PTtu of the buried object TU. However, the identifier ID may not be assigned to the distance image PTtu. In the embodiment, the identifier ID may be assigned to the image before being subjected to an imaging process in a stereo manner. In this case, another electronic device included in the excavator 1, the management device 61, or the mobile terminal device 64 may obtain the position Ptu of the buried object TU by performing an imaging process in a stereo manner on the image before being subjected to the imaging process with the identifier ID assigned thereto.

In the first embodiment, the position of this buried object is obtained by using the position of the work machine obtained by the position detection unit, the posture of the work machine obtained by the posture detection unit, and the three-dimensional shape of the buried object obtained by the object detection unit, and the buried object information including the position of this buried object is acquired. Since the position of the buried object buried in the ground can be known by the buried object information, it is possible to reduce the possibility of damage to the buried object under construction. In addition, in the first embodiment, the information for obtaining the position of the buried object is automatically detected by the position detection unit which obtains the position of the work machine, the posture detection unit which obtains the posture of the work machine, and the object detection unit which obtains the three-dimensional shape of the object, and the position calculation unit automatically obtains the position of the buried object by using the detected information. For this reason, according to the first embodiment, the buried object information can be easily obtained by the operation of the operator of the work machine. As a result, in the first embodiment, it is possible to reduce the burden of the work of obtaining the buried object information, and the worker for measuring the position of the buried object is unnecessary, so that labor saving of the work of obtaining the buried object information can be realized. That is, in the first embodiment, it is possible to reduce the burden of work for obtaining the buried object information.

The configuration disclosed in the first embodiment can also be appropriately applied in the following embodiments.

Second Embodiment

<Measurement of Position of Buried Object TU by Using Work Equipment 2>

Figure 11:
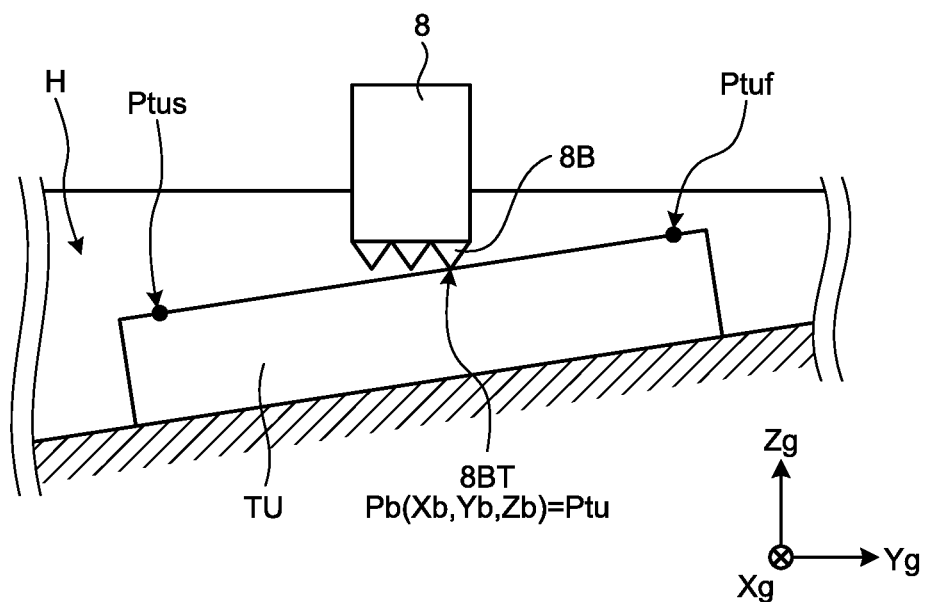
FIG. 11 is a diagram illustrating an example of measuring a position of a buried object by using a work equipment in a second embodiment.

FIG. 11 is a diagram illustrating an example of measuring the position of the buried object TU by using the work equipment 2 in a second embodiment. The excavator 1 according to the first embodiment obtains the position Ptu of the buried object TU by using the detection values of the shape measurement system 1S including at least a pair of imaging devices 30, the position detection device 23, and the IMU 24. The second embodiment is different from the first embodiment in that the position of a portion of the work equipment 2 in a case where the portion of the work equipment 2 contacts the buried object TU is set as the position of the buried object TU, so that the position of the buried object TU is obtained.

In the second embodiment, the cutting edge 8BT of the blade 8B of the bucket 8 is used as a portion of the work equipment 2. The position Pb (Xb, Yb, Zb) where the cutting edge 8BT of the bucket 8 contacts the buried object TU is the position Ptu of the buried object TU. The position Pb (Xb, Yb, Zb) of the cutting edge 8BT of the blade 8B of the bucket 8 is obtained by the display device 55 as described in the first embodiment. The display device 55 is a work equipment position detection unit which obtains the position of at least a portion of the work equipment 2.

The position calculation device 54 obtains the position of the buried object TU by using the position of the excavator 1 obtained by the position detection device 23, the posture of the excavator 1 obtained by the IMU 24, and the position of a portion of the work equipment 2 detected by the display device 55 in a case where a portion of the work equipment 2 contacts the buried object TU. In a case where the buried object TU is a pipe, the inclination of the buried object TU can be obtained from the first position Ptuf in the longitudinal direction of the buried object TU and the second position Ptus in a portion separated by a predetermined distance from the first position Ptuf along the longitudinal direction.

In the second embodiment, the position calculation device 54 obtains the position of the cutting edge 8BT as the position Ptu of the buried object TU, and the construction management device 56 generates the buried object information IFd. However, the present invention is not limited thereto. The position Ptu of the buried object TU and the buried object information IFd may be obtained by another electronic device included in the excavator 1 or may be obtained by the management device 61 and the mobile terminal device 64. For example, the management device 61 and the mobile terminal device 64 may acquire the current positions of the antennas 21 and 22 detected by the position detection device 23, the rotation angle of the work equipment 2 detected by the first angle detection unit 18A and the like, the size of the work equipment 2, and the output data of the IMU 24 to obtain the position of the cutting edge 8BT.

The second embodiment exhibits the same functions and effects as those of the first embodiment. Furthermore, in the second embodiment, even in a case where the excavator 1 does not include the imaging device 30, if the excavator 1 includes the position detection device 23 and the IMU 24, there is an advantage in that the position Ptu of the buried object TU can be obtained.

Third Embodiment

In the above-described embodiments, the operator of the management device 61 or the operator of the excavator 1 obtains the position Ptu of the buried object TU by designating the buried object TU existing in the distance image PTtu of the buried object TU or the image before being processed by the detection processing device 51 by using the position calculation device 54 which is a position calculation unit. However, the position Ptu of the buried object TU may be obtained by other methods. In addition, in a case where the operator of the management device 61 designates the buried object TU, the position calculation device 54 may exist in the management device 61.

Figure 12:
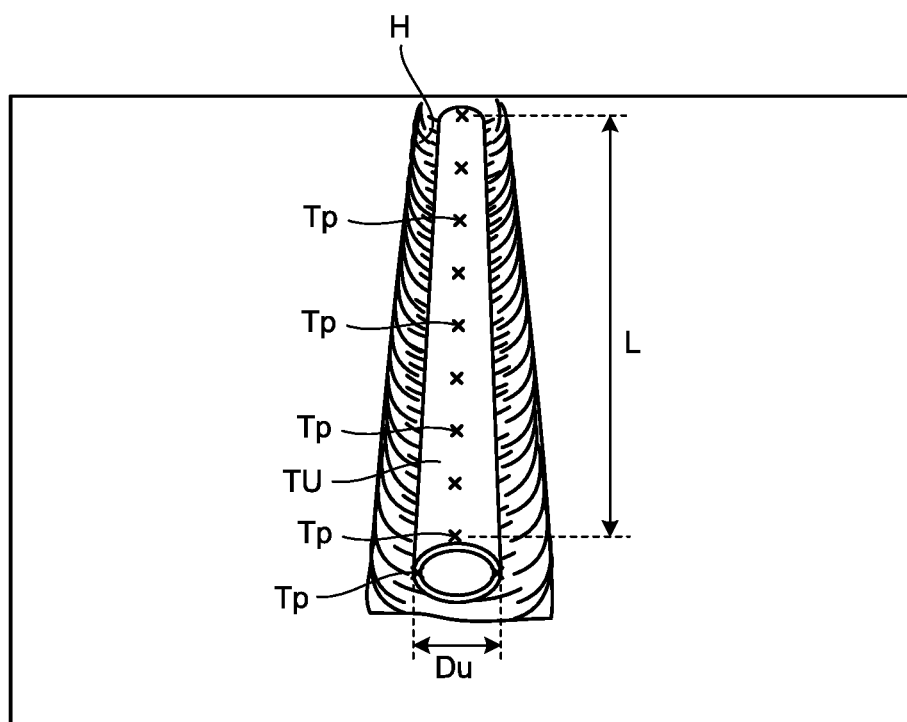
FIG. 12 is a diagram illustrating an example of a detected image according to a third embodiment.

FIG. 12 is a diagram illustrating an example of an image captured by one imaging device 30 before being processed by the detection processing device 51. The imaging device 30 corresponds to an object detection unit which detects a construction object around the excavator 1. For example, in a case where there exists an image which has been captured by one imaging device 30 and has not been yet processed by the detection processing device 51 as illustrated in FIG. 12, the detection processing device 51 can calculate the coordinate position in each pixel of the image in FIG. 12 by performing stereo processing on the basis of the image and another image (not illustrated) paired with the image.

In the third embodiment, it is stated that the position calculation unit exists in the management device 61. For example, the management device 61 displays an image of the construction object captured by the imaging device 30 as illustrated in FIG. 12 on the display device which is an output unit connected to the input/output unit IO of the management device 61. In the state where the image is displayed on the display device, the operator of the management device 61 selects a predetermined portion (point Tp) of the buried object TU in the image displayed on the display device by using an input device (for example, a mouse) connected to the input/output unit IO of the management device 61. A plurality of points Tp may be selected. The management device 61 may obtain the position of the point in the image on the basis of the image captured by the imaging device 30 and the point Tp on the image selected by the input device and may designate the position of the point as the position Ptu of the buried object TU. The point Tp selected in the image of the buried object TU may be selected at an arbitrary position in the buried object TU. For example, as illustrated in FIG. 12, the point Tp may be selected at the upper end portion of the buried object TU.

In addition, as illustrated in FIG. 12, by selecting a plurality of points Tp along the shape of the buried object TU, the management device 61 may designate the position of the buried object TU and the overall shape on the basis of the selected plurality of points Tp. By selecting at least the points Tp at both ends of the buried object TU, the management device 61 can obtain the position of the buried object TU.

By selecting predetermined two points Tp of the buried object TU, the management device 61 may calculate and display the distance between the two points Tp on the basis of the position information of the two points Tp. For example, in a case where the buried object TU has a pipe shape, by selecting both end portions of the buried pipe, the management device 61 can calculate the total length L of the buried object TU. In addition, the management device 61 can calculate the gradient of the buried pipe on the basis of the positions of both end portions of the buried pipe. In addition, by selecting two points at both ends in the cross section of the buried pipe, the management device 61 can calculate the pipe diameter Du of the buried pipe.

In the above description, the method of specifying the position Ptu of the buried object TU by using the image captured by one imaging device 30 before being processed by the detection processing device 51 has been described. However, the present invention is not limited thereto. For example, the position Ptu of the buried object TU may be obtained by displaying the distance image PTtu or other three-dimensional shape data (such as point group data) on the display device and selecting a point on the display data displayed on the display device. The image before being processed by the detection processing device 51, the distance image PTtu, and the three-dimensional shape data are examples of a detected image detected by the object detection unit.

In addition, the display device may have an input function such as a touch panel, and a point of the detected image may be selected by the operator's touching of the touch panel.

In addition, in the third embodiment, it is assumed that the position calculation unit is configured as the management device 61, and the operation of selecting the position Ptu of the buried object TU is performed by using the input device and the display device connected to the management device 61. As in the above-described embodiments, the position calculation unit may be the position calculation device 54 of the excavator 1 or may be the mobile terminal device 64. The operation of selecting the position Ptu of the buried object TU may be performed by using the input device 52 and the display device 55 of the excavator 1. The display device in the input/output unit IO and the display device 55 in the excavator 1 are examples of an output unit. In addition, the input device in the input/output unit IO and the input device 52 in the excavator 1 are examples of an input unit.

In addition, in the above-described embodiments, the management system 100 may be a system including all the excavator 1, the management facility 60, the network NTW, and the mobile terminal device 64, may be a system closed to the excavator 1, may be a system closed to the management facility 60, or may be a system closed to the mobile terminal device 64.

Although the first, second, and third embodiments have been described above, the first, second, and third embodiments are not limited by the contents described above. The above-mentioned components include those which can easily be conceived by the skilled in the art, substantially the same ones, and so-called equivalents. The above-described components can be appropriately combined. At least one of various omissions, substitutions, and changes of the components can be made without departing from the spirits of the first and second embodiments.

REFERENCE SIGNS LIST

1 EXCAVATOR
1S SHAPE MEASUREMENT SYSTEM
2 WORK EQUIPMENT
8 BUCKET
8BT CUTTING EDGE
18A FIRST ANGLE DETECTION UNIT
18B SECOND ANGLE DETECTION UNIT
18C THIRD ANGLE DETECTION UNIT
23 POSITION DETECTION DEVICE
25A ANTENNA
30, 30a, 30b, 30c, 30d IMAGING DEVICE
32 IMAGING SWITCH
51 DETECTION PROCESSING DEVICE
52 INPUT DEVICE
53 SENSOR CONTROL DEVICE
54 POSITION CALCULATION DEVICE
55 DISPLAY DEVICE
56 CONSTRUCTION MANAGEMENT DEVICE
56M STORAGE UNIT
60 MANAGEMENT FACILITY
61 MANAGEMENT DEVICE
61M STORAGE UNIT
64 MOBILE TERMINAL DEVICE
100 MANAGEMENT SYSTEM
IFd BURIED OBJECT INFORMATION
TU BURIED OBJECTS

The invention claimed is:

1. A management system comprising:
    The communication device having antennas for wireless communication;
    a position detection device mounted on a work machine and configured to obtain a position of the work machine by using signals acquired from antennas;
    an IMU mounted on the work machine and configured to obtain a posture of the work machine;
    an object detection unit mounted on the work machine and configured to obtain a three-dimensional shape of a buried object below the surface of the ground;
    a processor configured to obtain a position of the buried object by using the position of the work machine obtained by the position detection device, the posture of the work machine obtained by the IMU, and the three-dimensional shape of the buried object obtained by the object detection unit; and
    a memory configured to store the position of the buried object obtained by the processor,
    wherein the position of the buried object is output to the outside of the memory on demand.

2. The management system according to claim 1, further comprising:
    at least one imaging device mounted on the work machine and configured to image a buried object below the surface of the ground, and
    an identifier assignment processor unit mounted on the work machine and configured to assign an identifier to an image of the buried object imaged by the imaging device,
    wherein the memory is further configured to store the image of the buried object with the identifier.

3. A management system comprising:
    a communication device having antennas for wireless communication;
    a position detection device mounted on a work machine and configured to obtain the position of a work machine by using signals acquired from antennas;
    an IMU mounted on the work machine and configured to obtain a posture of the work machine;
    a work equipment position detection processor unit configured to obtain a position of at least a portion of a work equipment included in the work machine;
    a processor configured to obtain a position of a buried object below the surface of the ground by using the position of the work machine obtained by the position detection device, the posture of the work machine obtained by the IMU, and the position of the portion of the work equipment detected by the work equipment position detection processor unit; and
    a memory configured to store the position of the buried object obtained by the processor,
    wherein the position of the buried object is output to the outside of the memory on demand.

4. The management system according to claim 3, wherein the memory is further configured to store at least one of a size of the buried object, a type of the buried object, and a date at which the position of the buried object is obtained.

5. The management system according to claim 3, further comprising a storage device configured to store the position of the buried object.

6. A management system comprising:
a communication device having antennas for wireless communication;
a position detection device mounted on a work machine and configured to obtain a position of a work machine by using signals acquired from antennas;
at least one imaging device mounted on the work machine and configured to image a buried object below the surface of the ground;
a memory configured to store an image of the buried object obtained by the imaging device,
wherein the memory is configured to store the image of the buried object with an identifier indicating that the buried object is included in the image and a position and a date of the work machine at a time when the image of the buried object is captured, and
wherein the image of the buried object is output to the outside of the memory on demand.

7. A management system comprising:
a communication device having antennas for wireless communication;
a position detection device mounted on a work machine and configured to obtain a position of a work machine by using signals acquired from antennas;
an IMU mounted on the work machine and configured to obtain a posture of the work machine;
an object detection unit mounted on the work machine and configured to obtain a three-dimensional shape of a buried object below the surface of the ground;
an output unit configured to output a detected image detected by the object detection unit;
an input unit configured to select a position on the detected image output by the output unit;
a processor configured to obtain a point on the detected image selected by the input unit as a position of the buried object by using the position of the work machine obtained by the position detection device, the posture of the work machine obtained by the IMU, and the three-dimensional shape of the buried object obtained by the object detection unit; and
a memory configured to store the position of the buried object obtained by the processor,
wherein the position of the buried object is output to the outside of the memory on demand.

8. A management system comprising:
a communication device having antennas for wireless communication;
an output unit configured to output a detected image detected by an object detection unit mounted on a work machine and configured to detect a construction object around the work machine;
an input unit configured to select a point on the detected image output by the output unit; and
a processor configured to obtain a position of the point in the detected image on the basis of the point on the detected image selected by the input unit and configured to set the position of the point as a position of the buried object,
wherein the processor is further configured to output the position of the buried object to the outside on demand.

9. The management system according to claim 1, wherein the memory is further configured to store at least one of a size of the buried object, a type of the buried object, and a date at which the position of the buried object is obtained.

10. The management system according to claim 1, further comprising a storage device configured to store the position of the buried object.

* * * * *